(12) United States Patent
Heinonen et al.

(10) Patent No.: US 7,113,763 B2
(45) Date of Patent: Sep. 26, 2006

(54) BLUETOOTH ACCESS POINT AND REMOTE BLUETOOTH MODULES FOR POWERLINE BASED NETWORKING

(75) Inventors: Tomi Heinonen, Tampere (FI); Timo M. Laitinen, Tampere (FI); Pekka Suvitaival, Maisala (FI); Paavo Hynynen, Helsinki (FI); Franck Maillot, Espoo (FI)

(73) Assignee: Nokia Corporation, Espoo (FI)

( * ) Notice: Subject to any disclaimer, the term of this patent is extended or adjusted under 35 U.S.C. 154(b) by 519 days.

(21) Appl. No.: 10/162,290

(22) Filed: Jun. 3, 2002

(65) Prior Publication Data

US 2003/0224728 A1 Dec. 4, 2003

(51) Int. Cl.
*H04M 9/00* (2006.01)
*H04M 1/00* (2006.01)
*H04B 1/38* (2006.01)

(52) U.S. Cl. .................. 455/402; 455/561; 455/41.2

(58) Field of Classification Search ............... 455/402, 455/41.1–41.3, 561, 445, 7, 11.1; 709/252; 340/310.11; 370/401
See application file for complete search history.

(56) References Cited

U.S. PATENT DOCUMENTS

| | | | | |
|---|---|---|---|---|
| 4,642,607 A | * | 2/1987 | Strom et al. | 340/310.07 |
| 5,148,144 A | * | 9/1992 | Sutterlin et al. | 340/310.01 |
| 5,717,685 A | * | 2/1998 | Abraham | 340/310.01 |
| 5,839,075 A | * | 11/1998 | Haartsen et al. | 455/450 |
| 5,946,617 A | * | 8/1999 | Portaro et al. | 455/422.1 |
| 6,130,896 A | | 10/2000 | Lueker et al. | |
| 6,496,105 B1 | * | 12/2002 | Fisher et al. | 340/310.01 |
| 6,771,933 B1 | * | 8/2004 | Eng et al. | 455/41.2 |
| 6,856,799 B1 | * | 2/2005 | Ritter | 455/402 |
| 2002/0095662 A1 | * | 7/2002 | Ashlock et al. | 717/136 |
| 2002/0121963 A1 | * | 9/2002 | Kline | 340/310.01 |
| 2003/0003868 A1 | * | 1/2003 | Juurikko | 455/41 |
| 2003/0108062 A1 | * | 6/2003 | Agrawal et al. | 370/463 |
| 2003/0207683 A1 | * | 11/2003 | Lempio et al. | 455/422.1 |

FOREIGN PATENT DOCUMENTS

| | | |
|---|---|---|
| WO | WO 97/40610 | 10/1997 |
| WO | WO 01/35544 | 5/2001 |

* cited by examiner

*Primary Examiner*—Lester G. Kincaid
*Assistant Examiner*—Marivelisse Santiago-Cordero
(74) *Attorney, Agent, or Firm*—Morgan & Finnegan, L.L.P.

(57) ABSTRACT

A powerline based network including a powerline, a Bluetooth access point connected to the powerline, and a remote Bluetooth module connected to the powerline capable of communicating with the access point via the powerline. The access point includes a plug for connection to an electrical outlet of the powerline, a Bluetooth communication module for transmitting and receiving wireless data signals, an external network interface for communicating with an external network, and a routing means for routing data signals via the powerline. The remote Bluetooth module includes a plug for connection to an electrical outlet of a powerline, a Bluetooth communication module for transmitting and receiving wireless data signals, and a routing means for routing data signals via the powerline.

49 Claims, 5 Drawing Sheets

BLUETOOTH ACCESS POINT AND REMOTE BLUETOOTH MODULES FOR POWERLINE BASED NETWORKING

FIELD OF THE INVENTION

The present invention relates to a powerline based network and more particularly, to such a network that includes at least one wireless short range radio frequency communication access point and remote wireless short range radio frequency communication modules.

BACKGROUND OF THE INVENTION

A typical wireless communication system includes a number of access points interconnected by a cable medium commonly referred to as a system backbone. Associated with each access point is a coverage area, in which an access point has sufficient signal strength to transmit or receive data signals from wireless communication devices. In order to provide sufficient coverage within a wireless communication system, access points have been distributed at separate physical locations throughout a home or business.

Before the advent of wireless communication systems, traditional data signals had been transmitted on independent networks such as telephone lines. More recently, in order to simplify and increase efficiency of telecommunications services to homes or businesses, powerlines have been used as a medium through which data signals may be transmitted from one electrical device to another over a local area network (LAN).

In lieu of powerline based networks, radio frequency (RF) technology has also been used to wirelessly connect one electrical device to another in a home or business. RF based networks, which include expensive access points, enable electronic devices to communicate wirelessly through RF signals. However, RF based networks rarely achieve complete coverage in a home or business due to obstructions such as metal laths in walls or interference from cordless telephones.

Thus, there is a need for a network that enables comprehensive wireless communication at relatively inexpensive cost.

SUMMARY OF THE INVENTION

The present invention overcomes the foregoing and other problems encountered in known teachings by providing a system and method of powerline based networking comprising a wireless short range radio frequency (RF) communication access point (AP) and remote wireless short range RF communication modules (RBTMs). Advantageously, the system operates on the existing wiring, for example, in a home or business, previously reserved for power transmission. Thereby, alleviating the need for additional wiring. Further, comprehensive wireless communication is possible because a plurality of inexpensive RBTMs may be placed in a number of physical locations throughout the home or business. Thus, expanding the network's coverage area and compensating for weakened signals resulting from interference. In addition, routers, bridges, and other networking equipment are unnecessary because the AP controls and routes all communication.

In one embodiment of the system and method of the present invention, a powerline based network comprises a powerline, an AP for routing a data signal via the powerline to a destination, wherein a destination remote wireless short range RF communication module identifier (RBTM ID) and a destination wireless short range RF communication device identifier (Device ID) are appended to the data signal, an RBTM for receiving the data signal from the AP when the destination RBTM ID is associated with the RBTM, and a wireless short range radio frequency communication device (Device) disposed in an RBTM coverage area for receiving the data signal from the RBTM, wherein the Device is associated with the Device ID.

In another embodiment of the system and method an AP comprises a plug for connection to an electrical outlet of a powerline, a wireless short range RF communication module for transmitting and receiving wireless data signals, an external network interface for communicating with an external network, and a routing means for routing a data signal via the powerline to a destination, wherein a destination RBTM ID and a destination Device ID are appended to the data signal.

In a further embodiment of the system and method an RBTM comprises a plug for connection to an electrical outlet of a powerline, a wireless short range RF communication module for transmitting and receiving a wireless data signal, and a routing means for wirelessly routing a data signal to a Device disposed in an RBTM's coverage area, wherein the data signal is received from an AP when a destination RBTM ID is associated with the RBTM.

In another embodiment of the system and method a transformer bridge for use in a powerline based network comprises a first detector on an input side of a transformer for filtering and converting data from a data signal received from a powerline during a voltage phase shift, a conduit for passing the data from the first detector to a second detector, and a second detector on an output side of the transformer for converting the data to be transmitted over the powerline.

In a further embodiment of the system and method a current phase bridge for use in a powerline based network comprises a first detector on an input side of a transformer for filtering and converting data from a data signal received from a powerline during a current phase shift, a conduit for passing the data from the first detector to a second detector, and a second detector on an output side of the transformer for converting the data to be transmitted over the powerline.

The above advantages and features are of representative embodiments only, and are presented only to assist in understanding the invention. It should be understood that they are not to be considered limitations on the invention as defined by the claims, or limitations on equivalents to the claims. For instance, some of these advantages may seem mutually contradictory, in that they cannot be simultaneously implemented in a single embodiment. Similarly, some advantages are primarily applicable to one aspect of the invention. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The accompanying drawings illustrate certain embodiments of the invention.

DETAILED DESCRIPTION

In the following description of the various embodiments, reference is made to the accompanying drawings which form a part hereof, and which show by way of illustration various embodiments in which the invention may be practiced. It is to be understood that other embodiments may be utilized and structural and functional modifications may be made without departing from the scope of the present invention.

Figure 1:
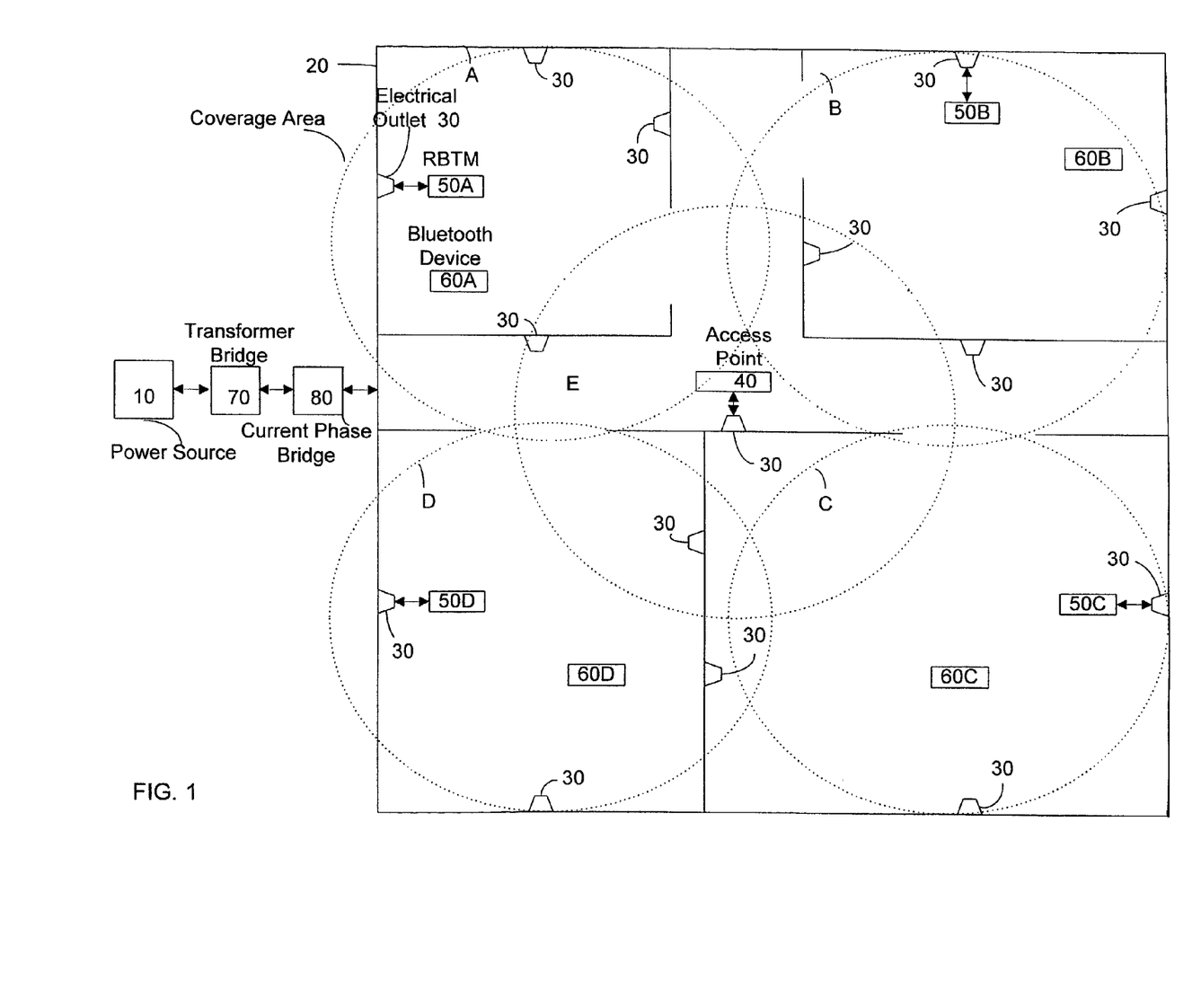
FIG. 1 illustrates a representative arrangement employing the principles of the present invention.

FIG. 1 illustrates a representative arrangement employing the principles of the present invention. As shown in FIG. 1, a power source 10 such as, a power generation station, electric generator, or the like, transmits power to an environment in need of power such as a home, business, etc. The environment includes a powerline 20 for distributing power therein. It is to be understood that the present invention is not restricted to any particular type of powerline 20.

As shown in FIG. 1, electrical outlets 30 are dispersed throughout the environment to provide power from the powerline 20. A wireless short range radio frequency (RF) communication access point, such as a Bluetooth access point (AP) 40 according to a preferred embodiment of the present invention, and a plurality of remote wireless short range RF communication modules, such as remote Bluetooth modules (RBTMs) 50A–D according to a preferred embodiment of the invention, receive power from the electrical outlets 30. It should be noted and understood that while Bluetooth communication is specified as a particular technique embodying the present invention, other wireless short range radio communication techniques may also be used. Such techniques include, for example, the IEEE 802.11 Wireless LAN standard and the HIPERLAN standard.

As further shown in FIG. 1, when the AP 40 and at least one of the RBTMs 50A–D are connected to the powerline 20 they form a powerline based network. In the powerline based network of the present invention, the AP 40 acts as a central server by controlling and coordinating all (externally and internally) transmitted data signals between RBTMs 50A–D. The RBTMs 50A–D serve as an interface between the AP 40 and a plurality of wireless short range RF communication devices, such as Bluetooth devices 60A–D via powerline 20 according to the preferred embodiment of the invention. A Bluetooth device 60 may be a portable electronic device such as, a cellular telephone, personal digital assistant (PDA), laptop computer, peripheral device, or the like, equipped with wireless communication capabilities. The Bluetooth device 60 may also be a fixed electronic device having an integrated communication module. Such a fixed electronic device may be a desktop computer or an evolved refrigerator or microwave oven having wireless communication capabilities.

As further shown in FIG. 1, each of the RBTMs 50A–D defines its own cell or coverage area A–D, respectively. Similarly, the AP 40 defines its own coverage area E. As shown in FIG. 1, a plurality of Bluetooth devices 60A–D are disposed in the coverage areas A–D. In this configuration, the Bluetooth devices 60A–D may communicate with each other or with external network elements including, for example, Internet elements, through the AP 40 via the RBTMs 50A–D, as will be discussed in detail hereinafter in connection with FIGS. 1–3. As shown in FIG. 1, data signals transmitted to and from external powerline based networks may be "bridged" by a transformer bridge 70 or a current phase bridge 80 as will be discussed in detail hereinafter in connection with FIGS. 4 and 5. The transformer bridge 70 and current phase bridge 80 may also be located within the environment to "bridge" data signals within the environment's powerline based network.

Figure 2:
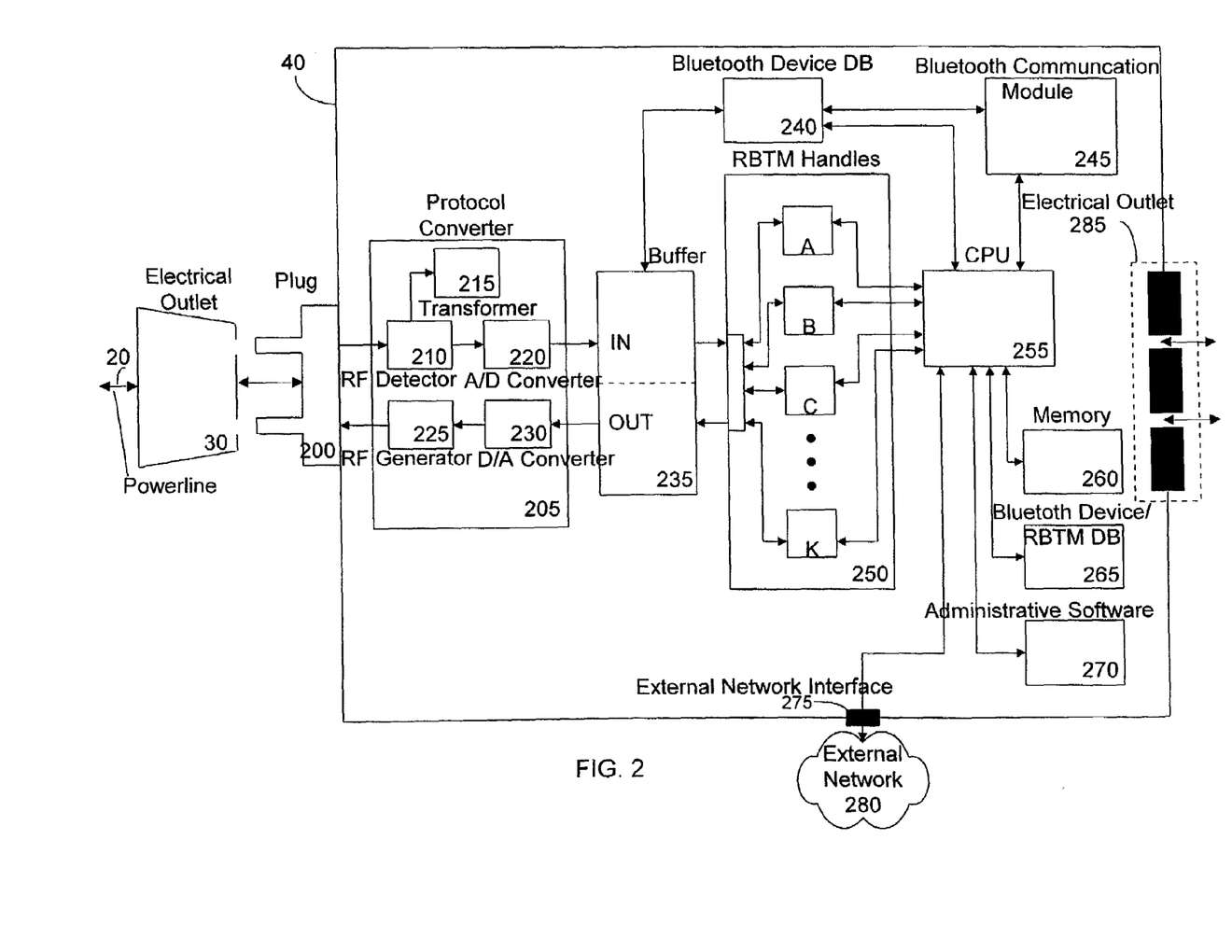
FIG. 2 illustrates an exemplary embodiment of the Bluetooth access point.

FIG. 2 illustrates an exemplary embodiment of the AP 40. As shown in FIG. 2, the AP 40 includes a plug 200 for connection to an electrical outlet 30 of a powerline 20. The plug 200 may be of any type of plug used throughout the world such as, type A, B, C, SE, O, or the like. The AP 40 further includes a central processing unit (CPU) 255, memory 260, and associated circuitry for operating the AP 40 as will be discussed in detail hereinafter.

The AP 40 also includes a Bluetooth communication module 245 for enabling wireless communication between the AP 40 and the Bluetooth devices 60A–D within the coverage area of the AP 40 and also between the AP 40 and the RBTMs 50A–D if the RBTMs 50A–D are located within the AP's 40 coverage area. The Bluetooth communication module 245 employs technology described in the "Specification of the Bluetooth System" available from Bluetooth SIG Headquarters, 7300 College Blvd., Suite 200, Overland Park, Kans. 66210, a copy of which is incorporated herein by reference. Bluetooth is a wireless technology that operates in the unlicensed Industrial, Scientific and Medical (ISM) radio band of 2.4 GHz, which includes a number of protocols that allow Bluetooth enabled devices to operate in a peer-to-peer environment.

The communication range of the Bluetooth communication module 245 is approximately 10 meters, however, with a 100 milliwatt transceiver the effective radial range may be extended to approximately 100 meters. It is noted, that in alternate embodiments, various Bluetooth communication module 245 constructs may focus and/or reshape the radial range into a non-radial geometry.

As shown in FIG. 2, the AP 40 includes a protocol converter 205 for converting between the transmission protocol used by the powerline 20 and the transmission protocol used by the AP 40. For converting data from the transmission protocol of the powerline 20 to the transmission protocol of the AP 40, the protocol converter 205 includes an RF detector 210 for passing RF data signals and attenuating signals not within the RF range. Thus, alternating current (AC) signals, which are transmitted in the frequency range of 50 Hz–60 Hz, are attenuated because they are not within the RF range. As shown in FIG. 2, a transformer 215 is coupled to the RF detector 210 for short-circuiting any residual AC signals not filtered by the RF detector 210. The protocol converter 205 also includes an analog-to-digital converter 220 for converting the filtered data signals to digital format. After the data is converted to digital format, it is passed to a buffer 235 for temporary storage pending an opportunity to be transferred to another location in the AP 40.

The protocol converter 205 is similarly used for converting data from the transmission protocol of the AP 40 to the transmission protocol of the powerline 20. For this purpose, the protocol converter 205 includes a digital-to-analog converter 230 for converting digital signals received from the buffer 235 to analog. The analog signals are subsequently passed to an RF generator 225, which generates a pulse with proper position and amplitude for powerline transmission. The protocol converter 205 then transmits the data signals over the powerline 20.

The CPU 255 of AP 40 includes at least one data processor adequate to execute program modules for executing user or system-generated requests. The CPU 255 may be a microprocessor such as the Intel Pentium Processor, StrongARM Processor, or the like.

As shown in FIG. 2, a memory 260 is communicatively coupled to the CPU 255. In a typical configuration, memory 260 will include ROM, RAM, and possibly a fixed storage device, for example, a hard disk drive. It is understood that AP 40 may employ various forms of memory 260 and because memory 260 is a fungible technology and resource, any number of memory 260 embodiments may be employed in lieu of or in concert with one another. Memory 260 may also contain a collection of program modules and data such as, but not limited to, an operating system module, and wireless communication protocols including but not limited to, a cellular communication protocol, for example, Code Division Multiple Access (CDMA), Time Division Multiple Access (TDMA), or Frequency Division Multiple Access (FDMA), Bluetooth communication protocols, or the like.

As shown in FIG. 2, the AP 40 includes Administrative Software 270 for configuring the powerline based network. A network administrator may program the AP 40 to configure the powerline based network by assigning addresses, which include a RBTM identifier (RBTM ID), to each of the RBTMs 50A–D disposed in communication with the AP 40. After the AP 40 assigns addresses to the RBTMs 50A–D the Administrative Software 270 configures the RBTM Handles 250. In doing so, each of the RBTMs 50A–D is assigned to an RBTM Handle 250. For example, RBTM 50A is assigned RBTM Handle 250A, RBTM 50B is assigned RBTM Handle 250B, etc. Thereby, all data signals transmitted to and from RBTMs 50A–D are routed through their assigned RBTM Handles 250.

In addition, the AP 40 may be self "learning." For example, the Administrative Software 270 may enable the AP 40 to "learn" the addresses of the RBTMs 50A–D by initiating a broadcast query via the wireless communication link and/or via the powerline 20, and then remembering the addresses of the RBTMs 50A–D that respond. The Administrative Software 270 may be programmed to perform this query process at regular intervals in order to repeat the "learning" process and, thereby, to adjust for the physical relocation of the RBTMs 50A–D, and other changes in the dynamic powerline based network. Further, the Administrative Software 270 enables the AP 40 to be programmed by receiving RBTM IDs via a Bluetooth protocol. For example, by placing a RBTM 50 in the AP's 40 coverage area, the RBTM 50 functions as a "slave" and transmits its RBTM ID via Bluetooth to the AP 40. Thus, the powerline based network can be configured before an RBTM 50 is placed in a physical location.

As further shown in FIG. 2, a Bluetooth Device database 240 is coupled to the CPU 255. The Bluetooth Device database 240 is used to provide identification information, such as Device identifiers (Device ID) and remote wireless short range RF communication module identifiers (RBTM ID) regarding the Bluetooth devices 60A–D, disposed in communication with the AP 40 via RBTMs 50A–D. For example, when a data signal is received from the network, the database 240 provides the CPU 255 with the destination addresses, which include Device IDs and RBTM IDs of the Bluetooth devices 60A–D, disposed in communication with the AP 40. This enables the CPU 255 to route the data signal to its destination.

The AP 40 further includes a Bluetooth Device/RBTM database 265 communicatively coupled to the CPU 255. Database 265 enables a Bluetooth device 60 to access an external network 280, via an external network interface 275, without requiring the Bluetooth device 60 to register an external address. For example, when a Bluetooth device 60 communicates with an external network such as the internet, the database 265 will replace the source address in headers of packets with the source address of the AP 40. Similarly, when a response from the external network is received at the AP 40, the database 265 will replace the destination address in headers of packets with the address pertaining to the Bluetooth device 60 that sent the communication.

As illustrated in FIG. 2, the AP 40 may also include an electrical outlet 285 for receiving a plug from an electronic device for providing electricity.

Figure 3:
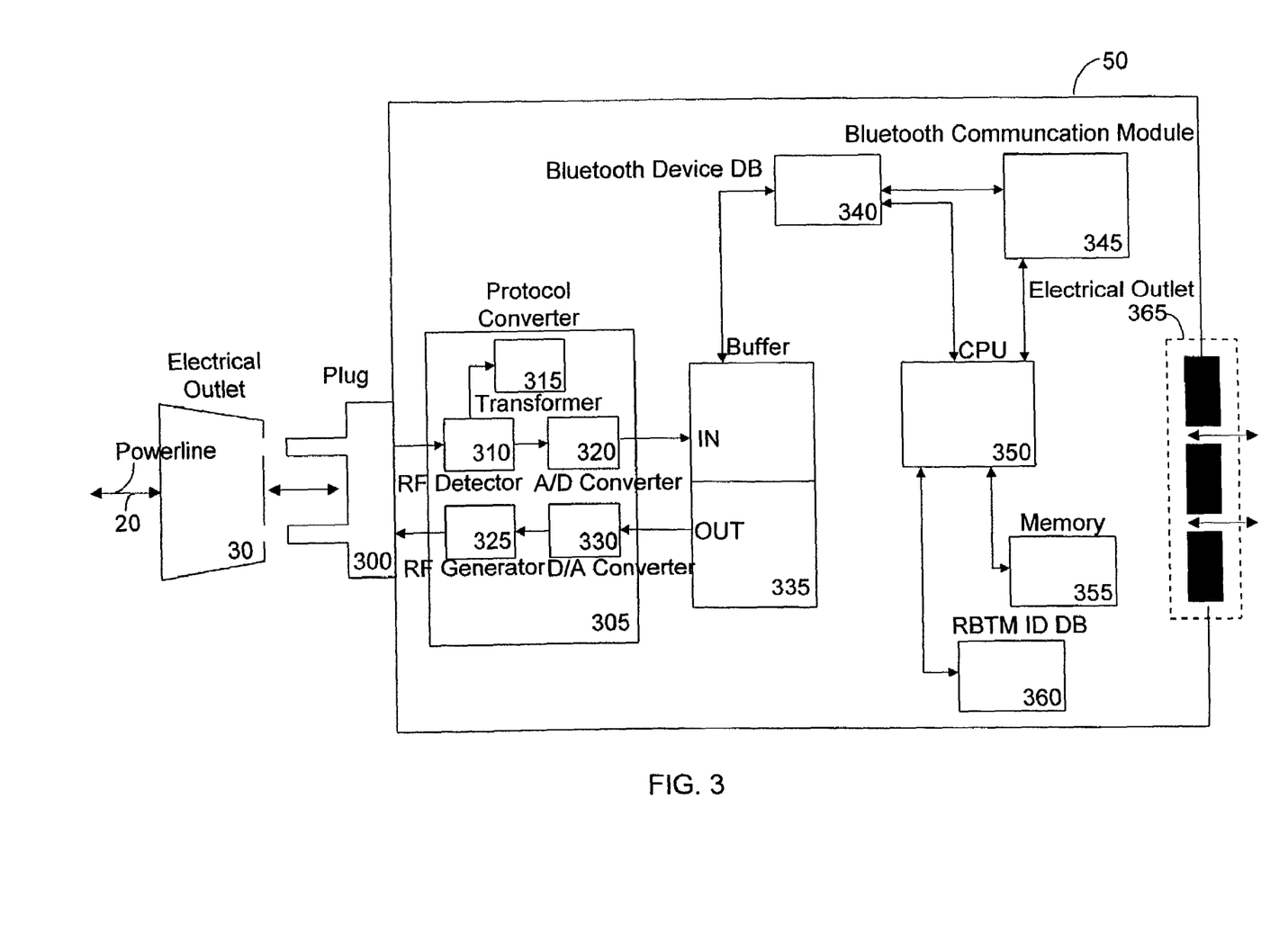
FIG. 3 illustrates an exemplary embodiment of the remote Bluetooth module.

FIG. 3 illustrates an exemplary embodiment of the RBTM 50. As shown in FIG. 3, the RBTM 50 includes a plug 300 for connection to an electrical outlet 30 of a powerline 20. The RBTM 50 also includes a protocol converter 305, RF detector 310, transformer 315, analog-to-digital converter 320, RF generator, 325, digital-to-analog coverter 330, buffer 335, Bluetooth communication module 345, CPU 350, memory 355, and an electrical outlet 365. It is to be understood by one of ordinary skill in the art that the aforementioned elements of the RBTM 50 are the same or similar to their counterpart elements described in relation to the AP 40 of FIG. 2.

As further shown in FIG. 3, the RBTM 50 also includes an RBTM ID database 360 communicatively coupled to the CPU 350. The RBTM ID database 360 is used to add an RBTM ID to the header of each data signal that is transmitted from a Bluetooth device 60, within an RBTM's 50 coverage area, to the AP 40. In this manner, the RBTM 50 informs the AP 40 of the source of the data signal so the AP 40 can route a response to the data signal back to the its source through its corresponding RBTM Handle 250.

The RBTM 50 also includes a Bluetooth Device database 340 to assist in routing communications received from the AP 40. The database 340 includes the addresses of the Bluetooth devices 60 disposed in communication with the RBTM 50. For example, when the RBTM 50 receives a data signal from the AP 40, it reads the destination address, which includes a Device ID, in the header and then compares the address with the Bluetooth device 60 identification information in database 340. In this manner, RBTM 50 may route the data signal to the appropriate bluetooth device 60.

Figure 4:
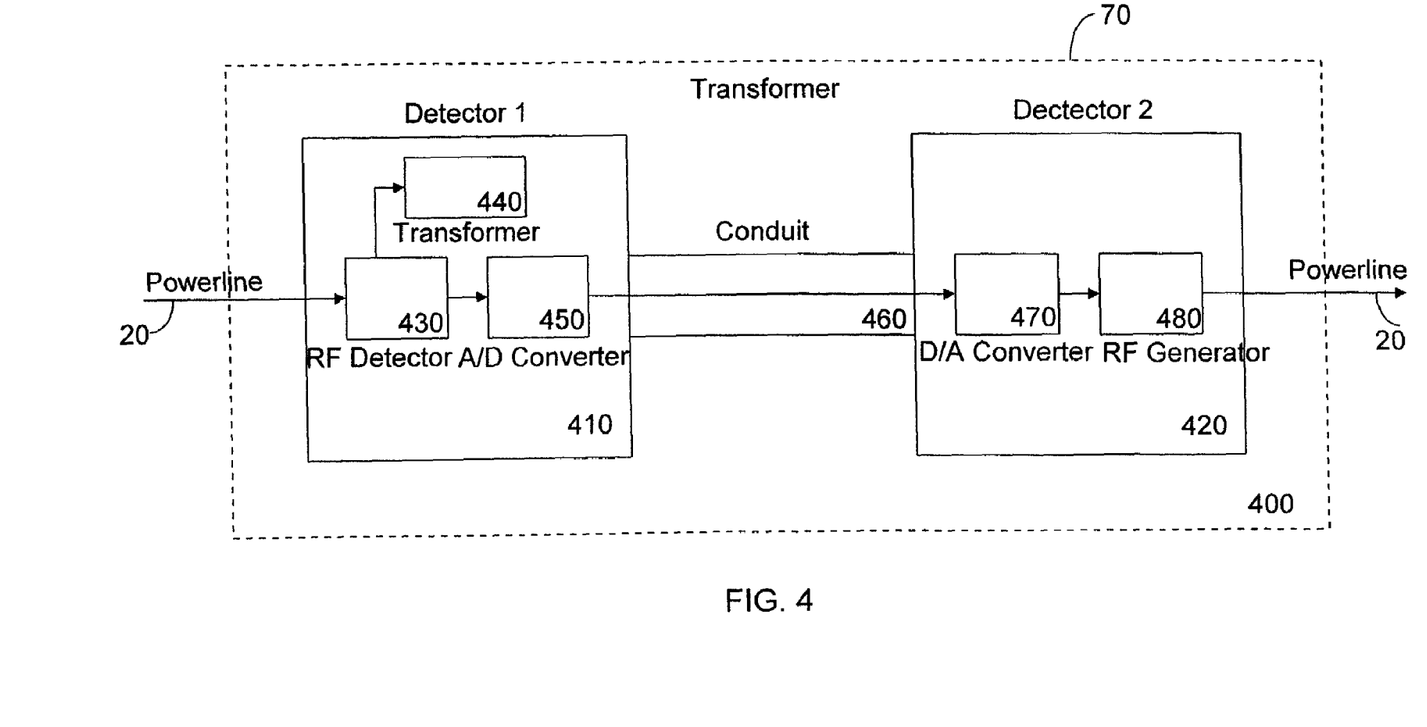
FIG. 4 illustrates an exemplary embodiment of the transformer bridge.

FIG. 4 illustrates an exemplary embodiment of the transformer bridge 70 shown in FIG. 1. The transformer bridge 70 "bridges" data signals around a transformer 400 during voltage phase shifts that occur in three-phase powerline networks. The transformer bridge 70 includes a first detector 410 communicatively coupled to a second detector 420 via a conduit 460.

As shown in FIG. 4, the first detector 410 is located on the input side (i.e., primary winding) of the transformer 400. The first detector 410 is used to filter and convert data signals from current in the powerline 20 during a voltage phase shift. The first detector 410 includes an RF detector 430, a transformer 440, and an analog-to digital converter 450 to perform the filtering and data conversion. It is to be understood by one of ordinary skill in the art that the aforementioned elements of the first detector 410 are the same or similar to their counterpart elements described in relation to the AP 40 of FIG. 2 or RBTM 50 of FIG. 3.

After the data is filtered and converted in the first detector 410 it is passed to a second detector 420 through a conduit 460. The conduit 460 may be an optoelectric insulator such as an optical cable. The conduit 460 may also be a twisted pair cable for transmitting high frequency signals, or the like.

As shown in FIG. 4, the second detector 420 is disposed on the output side (i.e., secondary winding) of the transformer 400. When data is received at the second detector 420, the data is converted from the transmission protocol used by the first detector 410 to the transmission protocol used by the powerline 20. To accomplish this the second detector 420 includes a digital-to-analog converter 470 for converting the data to analog. The second detector 420 additionally includes an RF generator 480 for receiving the analog signal from the digital-to-analog converter 470. The RF generator 480 subsequently generates a pulse with proper position and amplitude for powerline transmission. The second detector 420 then transmits the data over the powerline 20. Thus, the transformer bridge 70 prevents unwanted data corruption by enabling the data to bypass the transformer 400. Once again, it is to be understood that the aforementioned elements of the second detector 420 are the same or similar to their counterpart elements described in relation to the AP 40 of FIG. 2 or RBTM 50 of FIG. 3.

Figure 5:
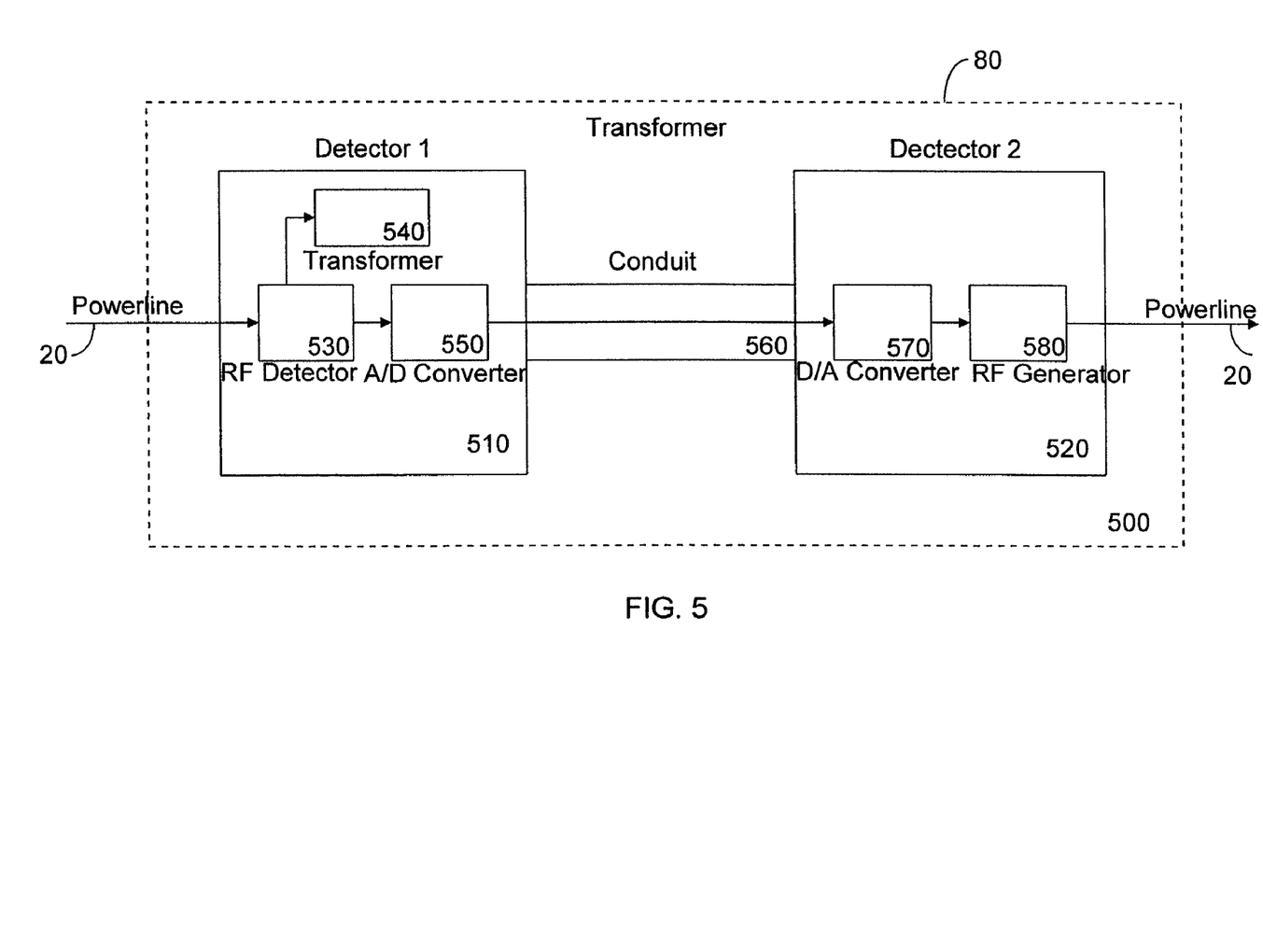
FIG. 5 illustrates an exemplary embodiment of the current phase bridge.

FIG. 5 illustrates a sample embodiment of the current phase bridge 80 shown in FIG. 1. The current phase bridge 80 is provided to "bridge" data packets over a transformer 500 during current phase shifts that occur in three-phase powerline networks. Thereby, preventing data corruption by allowing the data to bypass the transformer 500. Similar to the transformer bridge 70 of FIG. 4, the current phase bridge 80 comprises a first detector 510 communicatively coupled to a second detector 520 via a conduit 560.

As shown in FIG. 5, the first detector 510 includes an RF detector 530, transformer 540, and an analog-to-digital converter 550. The second detector 520 includes a digital-to-analog converter 570, and an RF generator 580. It is to be understood that the aforementioned elements of the current phase bridge 80 are the same or similar to their counterpart elements described in relation to the transformer bridge 70 of FIG. 4.

Referring back to the arrangement of FIG. 1, each of the RBTMs 50A–D defines its own coverage area. For example, RBTM 50A defines coverage area A, RBTM 50B defines coverage area B, etc. Thus, a Bluetooth device 60, disposed in a coverage area, may communicate with the RBTM 50 associated with that coverage area, using a Bluetooth protocol. Further, if a Bluetooth device 60 is situated in a location where two coverage areas overlap, the first RBTM 50 to receive a data signal from the Bluetooth device 60 forwards it to the AP 40.

As shown in FIG. 1, a Bluetooth device 60 can communicate with another Bluetooth device 60 when both devices are disposed in different coverage areas. For example, Bluetooth device 60A may communicate (i.e., transmit data signals) with Bluetooth device 60C by initiating a communication with the RBTM 50A, which in turn forwards the communication to the AP 40, using the techniques described above in connection with FIGS. 2 and 3. The AP 40 then routes the communication to the RBTM 50C, which in turn, forwards the communication to Bluetooth device 60C.

As illustrated in FIG. 1, a Bluetooth device 60 may also communicate with an external network such as, the internet or a public network, using the techniques described above in connection with FIGS. 2 and 3. For example, Bluetooth device 60A may initiate a communication, destined for the internet, with RBTM 50A, which in turn, forwards the communication to the AP 40. The AP 40 then routes the communication to the internet. Upon receipt of the communication from the internet the AP 40 routes the communication back to the RBTM 50A, which in turn routes the communication to the Bluetooth device 60A.

In other embodiments, wireless communication can be according to the Infrared Data Association (IrDA) specification, Institute of Electronics and Electrical Engineers (IEEE) 802.11 specification, or the like.

In yet another embodiment, a powerline network can be constructed as a remote network using electrical generators and extension cords for outdoors or remote applications.

In another embodiment, a plurality of APs may be employed.

It should be understood that the above description is only representative of illustrative embodiments. For the convenience of the reader, the above description has focused on a representative sample of possible embodiments, a sample that is illustrative of the principles of the present invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. Other applications and embodiments can be conceived by those without departing from the spirit and scope of the present invention. It is therefore intended, that the invention is not to be limited to the disclosed embodiments but is to be defined in accordance with the claims that follow. It can be appreciated that many of those undescribed embodiments are within the scope of the following claims, and others are equivalent.

What is claimed is:

1. A powerline based network, comprising:
    a first remote wireless short range radio frequency (RF) communication module (RBTM) for receiving a data signal having a destination wireless short range RF communication device identifier (Device ID) from a first wireless short range RF communication device in a wireless RBTM coverage area of said first RBTM and forwarding the data signal to the powerline;
    a wireless short range RF communication access point (AP) for routing the data signal via the powerline to a destination based on the Device ID, wherein a destination RBTM identifier (ID) is appended to the data signal by accessing one or more databases providing associations between each RBTM under control of the AP and Device IDs of wireless short range RF communications devices currently located in the wireless RBTM coverage area of the RBTMs; and
    a second RBTM for receiving the routed data signal when the destination RBTM ID is associated with the RBTM and transmitting the data signal to a second wireless short range RF communication device (Device) disposed in a wireless RBTM coverage area of said second RBTM, wherein the Device is associated with the destination Device ID.

2. The network according to claim 1, wherein the RBTM sends a data signal received from the Device to the AP via the powerline.

3. The network according to claim 1, wherein the AP routes a data signal destined for an external network to an external network via an external network interface.

4. The network according to claim 3, wherein the AP replaces a source address of the data signal destined for the external network with an external network address associated with the AP's external network interface.

5. The network according to claim 4, wherein the AP stores the source address in a Device/RBTM database.

6. The network according to claim 3, wherein the AP routes a data signal received from the external network to a destination.

7. The network according to claim 6, wherein:
wherein the AP stores an original source address in a Device/RBTM database; and
the AP replaces a destination address with the original source address stored in the Device/RBTM database.

8. The network according to claim 1, wherein the wireless data signal is in accordance with the Bluetooth specification.

9. The network according to claim 1, wherein the wireless data signal is in accordance with one of an IEEE 802.11 Wireless LAN standard specification and the HIPERLAN standard specification.

10. The network according to claim 9, wherein the wireless data signal uses Code Division Multiple Access (CDMA), Frequency Division Multiple Access (FDMA), or Time Division Multiple Access (TDMA) techniques.

11. The network according to claim 1, wherein the Device is one of a cellular phone, a personal digital assistant (PDA), a portable computer, or peripheral device.

12. The network according to claim 1, further comprising:
a plurality of APs.

13. The network according to claim 1, further comprising:
a plurality of RBTMs.

14. The network according to claim 1, further comprising:
a plurality of Devices.

15. The network according to claim 1, wherein the Device is capable of communicating directly with the AP when it is disposed in an AP's coverage area.

16. The network according to claim 1, further comprising:
a transformer bridge, comprising:
    a first detector on an input side of a transformer for filtering and converting data from a data signal received from a powerline during a voltage phase shift;
    a conduit for passing the data from the first detector to a second detector; and
    a second detector on an output side of a transformer for converting the data to be transmitted over the powerline.

17. The network according to claim 16, wherein the conduit of the transformer bridge is an optical cable, or twisted-pair cable.

18. The network according to claim 1, further comprising:
a current phase bridge, comprising:
    a first detector on an input side of a transformer for filtering and converting data from a data signal received from a powerline during a current phase shift;
    a conduit for passing the data from the first detector to a second detector; and
    a second detector on an output side of a transformer for converting the data to be transmitted over the powerline.

19. The network according to claim 18, wherein the conduit of the current phase bridge is an optical cable, or twisted-pair cable.

20. An accesspoint (AP), comprising:
a plug for connection to an electrical outlet of a powerline;
a local wireless short range radio frequency (RF) communication module (RBTM) for transmitting and receiving a wireless data signal;
an external network interface for communicating with an external network;
a database for storing an address of a remote RBTM and an address of a device disposed in the remote RBTM's coverage area: and
routing means for routing a data signal via the powerline to a destination, wherein a destination RBTM identifier (ID) and a destination Device ID are retrieved from the database and appended to the data signal.

21. The AP according to claim 20, wherein the routing means routes a data signal destined for an external network to the external network via an external network interface.

22. The AP according to claim 21, wherein the routing means replaces an original source address of the data signal destined for an external network with the AP's external network address.

23. The AP according to claim 22, wherein the routing means stores the original source address in a Device/RBTM database.

24. The AP according to claim 21, wherein the routing means routes a data signal received from the external network to a destination.

25. The AP according to claim 24, wherein:
the routing means stores an original source address in a Device/RBTM database; and
the routing means replaces a destination address from the data signal with the original source address stored in the Device/RBTM database.

26. The AP according to claim 20, wherein the routing means filters data from the data signal received from the powerline.

27. The AP according to claim 26, wherein the routing means converts the data to data packets.

28. The AP according to claim 20, wherein the routing means converts data to be transmitted over the powerline.

29. The AP according to claim 20, further comprising:
a Device database.

30. The AP according to claim 20, further comprising:
a Device/RBTM database.

31. The AP according to claim 20, further comprising:
an electrical outlet for receiving a plug from an electronic device for providing electricity.

32. The AP according to claim 20, further comprising:
configuring means for configuring a powerline based network.

33. A radio frequency communication module (RBTM), comprising:
a plug for connection to an electrical outlet of a powerline;
a wireless short range radio frequency (RF) communication module for transmitting and receiving a wireless data signal, wherein a destination RBTM identifier (ID) and a Device ID are appended to the data signal;
a device database for storing an address of a device disposed in the RBTM's coverage area;
an RBTM database for storing an address of the RBTM; and
routing means for wirelessly routing the data signal to a Device associated with the Device ID, wherein the data signal is received from an Access Point (AP) when the destination RBTM ID is associated with the RBTM and the Device ID is stored in the device database.

34. The RBTM according to claim 33, wherein the routing means routes the data signal to a Device associated with a destination Device ID.

35. The RBTM according to claim 33, wherein the routing means routes a data signal received from a Device to an AP via the powerline.

36. The RBTM according to claim 35, wherein the routing means appends an RBTM ID to a data signal received from the Device.

37. The RBTM according to claim 33, wherein the routing means filters data from the data signal received from the powerline.

38. The RBTM according to claim 37, wherein the routing means converts the data to data packets.

39. The RBTM according to claim 33, wherein the routing means converts data to be transmitted over the powerline.

40. The RBTM according to claim 33, further comprising: an electrical outlet for receiving a plug from an electronic device for providing electricity.

41. A method of communicating between a first Device and a second Device via a powerline based network, comprising:
sending a data signal, from a first Device to a radio frequency communication module (RBTM), wherein the data signal includes a Device identifier (ID);
receiving the data signal, at the RBTM, wherein an RBTM ID is appended to the data signal;
storing the Device ID, at the RBTM, in a Device database;
sending the data signal, from the RBTM to an access point (AP), via a powerline;
receiving the data signal, at the AP, wherein a destination RBTM ID and a destination Device ID are appended to the data signal;
sending the data signal to its destination via the powerline;
receiving the data signal, at a destination RBTM, wherein the destination RBTM ID is associated with the destination RBTM; and
sending the data signal to a second device, which is disposed in communication with the destination RBTM, wherein the second Device is associated with the destination Device ID stored in the Device database.

42. A method of communicating between a Device and an external network via a powerline based network, comprising:
sending a data signal from a Device to a radio frequency communication module (RBTM), wherein the data signal includes a Device identifier (ID);
receiving the data signal, at the RBTM, wherein an RBTM ID is appended to the data signal;
storing the Device ID, at the RBTM, in a Device database;
sending the data signal from the RBTM to an access point (AP) via a powerline;
receiving the data signal, at the AP, wherein the AP replaces an original source address of the data signal with the AP's external network address;
storing the original source address, at the AP, in a Device/RBTM database;
sending the data signal, at the AP, to an external network via an external network interface;
receiving a data signal, at the AP, from the external network, wherein the AP replaces a destination address, with the original source address stored in the Device/RBTM database;
sending the data signal, from the AP, to its destination via the powerline;
receiving the data signal, at a destination RBTM, wherein the RBTM ID is associated with the destination RBTM; and
sending the data signal to the Device, which is disposed in communication with the destination RBTM, wherein the Device is associated with the destination Device ID stored in the Device database.

43. An access point (AP), comprising:
a processor;
a memory, communicatively connected to the processor;
a program stored in the memory, including,
 a module to route a data signal received via a powerline to a destination, wherein a destination radio frequency communication module (RBTM) identifier (ID) and a destination Device ID are appended to the data signal;
 a module to route a data signal destined for an external network to the external network via an external network interface;
 a module to replace an original source address of the data signal destined for an external network with the AP's external network address;
 a module to store the original source address in a Device/RBTM database;
 a module to route a data signal received from the external network to a destination; and
 a module to replace a destination address from the data signal with the original source address stored in the Device/RBTM database.

44. A radio frequency communication module (RBTM), comprising:
a processor;
a memory, communicatively connected to the processor;
a program stored in the memory, including,
 a module to implement a device database for storing an address of a device disposed in the RBTM's coverage area;
 a module to implement an RBTM database for storing an address of the RBTM;
 a module to wirelessly route a data signal to a Device wherein a destination RBTM identifier (ID) and a Device ID are appended to the data signal, and wherein the data signal is received from an access point (AP) when the destination RBTM ID is associated with the RBTM;
 a module to route the data signal to a Device associated with the destination Device ID, if the Device ID is stored in the device database;
 a module to route another data signal received from the Device to the AP via a powerline; and
 a module to append another RBTM ID to the other data signal received from the Device.

45. A powerline based network, comprising:
a first remote wireless short range radio frequency (RF) communication routing means for routing a data signal received from a wireless short range RF transmitting means;
a second wireless short range (RF) communication routing means for routing a data signal via the powerline to a destination, wherein a radio frequency communication module (RBTM) identifier (ID) and a Device ID are appended to the data signal;
a remote wireless short range RF communication receiving means for receiving the data signal from the second wireless short range RF communication routing means when the destination RBTM ID is associated with the remote wireless short range RF communication receiving means; and
a wireless short range RF communication receiving means disposed in a remote wireless short range RF communication receiving means coverage area for receiving the data signal from the remote wireless short range RF communication receiving means, wherein the wireless short range RF communication receiving means is associated with the destination Device ID.

46. The network according to claim 45, further comprising:
   a transformer means, comprising:
      a first detection means for filtering and converting data from a data signal received from a powerline during a voltage phase shift;
      a data passing means for passing the data from the first detection means to a second detection means; and
      a second detection means for converting the data to be transmitted over the powerline.

47. The network according to claim 45, further comprising:
   a current phase means, comprising:
      a first detection means for filtering and converting data from a data signal received from a powerline during a current phase shift;
      a data passing means for passing the data from the first detection means to a second detection means; and
      a second detection means for converting the data to be transmitted over the powerline.

48. A powerline based network, comprising:
   means for sending a data signal, from a first Device to a radio frequency communication module (RBTM), wherein the data signal includes a Device identifier (ID);
   means for receiving the data signal, at the RBTM, wherein an RBTM ID is appended to the data signal;
   means for storing the Device ID, at the RBTM, in a Device database;
   means for sending the data signal, from the RBTM to an access point (AP), via a powerline;
   means for receiving the data signal, at the AP, wherein a destination RBTM ID and a destination Device ID are appended to the data signal;
   means for sending the data signal to its destination via the powerline;
   means for receiving the data signal, at a destination RBTM, wherein the destination RBTM ID is associated with the destination RBTM; and
   means for sending the data signal to a second device, which is disposed in communication with the destination RBTM, wherein the second Device is associated with the destination Device ID stored in the Device database.

49. A powerline based network, comprising:
   means for sending a data signal from a Device to a radio frequency communication module (RBTM), wherein the data signal includes a Device identifier (ID);
   means for receiving the data signal, at the RBTM, wherein an RBTM ID is appended to the data signal;
   means for storing the Device ID, at the RBTM, in a Device database;
   means for sending the data signal from the RBTM to an access point (AP) via a powerline;
   means for receiving the data signal, at the AP, wherein the AP replaces an original source address of the data signal with an external network address associated with the AP;
   means for storing the original source address, at the AP, in a Device/RBTM database;
   means for sending the data signal, at the AP, to an external network via an external network interface;
   means for receiving a data signal, at the AP, from the external network, wherein the AP replaces a destination address, with the original source address stored in the Device/RBTM database;
   means for sending the data signal, from the AP, to its destination via the powerline;
   means for receiving the data signal, at a destination RBTM, wherein the RBTM ID is associated with the destination RBTM; and
   means for sending the data signal to the Device, which is disposed in communication with the destination RBTM, wherein the Device is associated with the destination Device ID stored in the Device database.

* * * * *